(12) United States Patent
Lanciaux

(10) Patent No.: US 9,995,503 B2
(45) Date of Patent: Jun. 12, 2018

(54) STRUCTURALLY REINFORCED DUCT

(71) Applicant: Fran Lanciaux, Grand Rapids, OH (US)

(72) Inventor: Fran Lanciaux, Grand Rapids, OH (US)

( * ) Notice: Subject to any disclaimer, the term of this patent is extended or adjusted under 35 U.S.C. 154(b) by 90 days.

(21) Appl. No.: 14/757,046

(22) Filed: Nov. 12, 2015

(65) Prior Publication Data

US 2016/0131389 A1    May 12, 2016

Related U.S. Application Data

(60) Provisional application No. 62/123,264, filed on Nov. 12, 2014, provisional application No. 62/234,032, filed on Sep. 29, 2015.

(51) Int. Cl.
*F16L 9/14* (2006.01)
*F24F 13/02* (2006.01)
*F16L 9/00* (2006.01)
*F16L 9/04* (2006.01)

(52) U.S. Cl.
CPC ............. *F24F 13/02* (2013.01); *F16L 9/003* (2013.01); *F24F 13/0254* (2013.01); *F16L 9/04* (2013.01)

(58) Field of Classification Search
CPC ............. F16L 9/00; F16L 9/04; F16L 9/003
USPC ............. 138/172, 148, 149, DIG. 4
See application file for complete search history.

(56) References Cited

U.S. PATENT DOCUMENTS

| 1,916,908 | A | | 7/1933 | Stacey, Jr. et al. | |
|---|---|---|---|---|---|
| 2,275,572 | A | * | 3/1942 | Somers | F16L 23/14 138/163 |
| 2,916,054 | A | * | 12/1959 | Callan | F16L 9/003 138/141 |
| 3,202,184 | A | * | 8/1965 | Godshalk | F16L 9/003 138/172 |
| 3,212,529 | A | | 10/1965 | Ullman et al. | |
| 3,251,382 | A | | 5/1966 | Tatsch | |
| 3,557,838 | A | * | 1/1971 | Savage | F16L 9/003 138/108 |
| 4,249,578 | A | * | 2/1981 | Freeman | F16L 9/003 138/149 |
| 4,315,361 | A | * | 2/1982 | Brooks | F16L 9/003 29/432.1 |
| 5,219,403 | A | * | 6/1993 | Murphy | F16L 9/003 137/561 A |
| 5,918,644 | A | | 7/1999 | Haack et al. | |
| 5,944,060 | A | | 8/1999 | MacKay | |
| 6,116,833 | A | * | 9/2000 | Ellis | F24F 13/02 138/172 |
| 6,360,783 | B2 | | 3/2002 | Faverio, IV et al. | |

(Continued)

*Primary Examiner* — Patrick F Brinson
(74) *Attorney, Agent, or Firm* — David C. Purdue

(57) ABSTRACT

Reinforced duct section comprising side walls defining a duct interior. At least two of the side walls are parallel. A compression member extends between ribs provided on the inside surfaces of the two parallel side walls to prevent the parallel side walls from bowing inwardly. A tension member extends between two force distribution members provided on the outside surfaces of the parallel side walls to prevent the side walls from bowing outwardly. The compression member may comprise a truss provided between two ribs. The truss may be longer than the duct section. The ribs may connect first and second flanges provided on the ends of the two parallel side walls.

8 Claims, 7 Drawing Sheets

(56) References Cited

U.S. PATENT DOCUMENTS

| | | | |
|---|---|---|---|
| 6,717,520 B1 | 4/2004 | Cook, II | |
| 6,763,853 B1 | 7/2004 | Redding et al. | |
| 6,901,969 B2 * | 6/2005 | Siiter | F24F 13/02 |
| | | | 138/172 |
| 7,712,787 B2 | 5/2010 | Vincenti | |
| 2006/0083889 A1 | 4/2006 | Schuckers | |
| 2011/0030833 A1 | 2/2011 | Griggio | |
| 2013/0074974 A1 * | 3/2013 | Murchie | F16L 9/04 |
| | | | 138/172 |
| 2014/0261846 A1 | 9/2014 | Lanciaux | |

\* cited by examiner

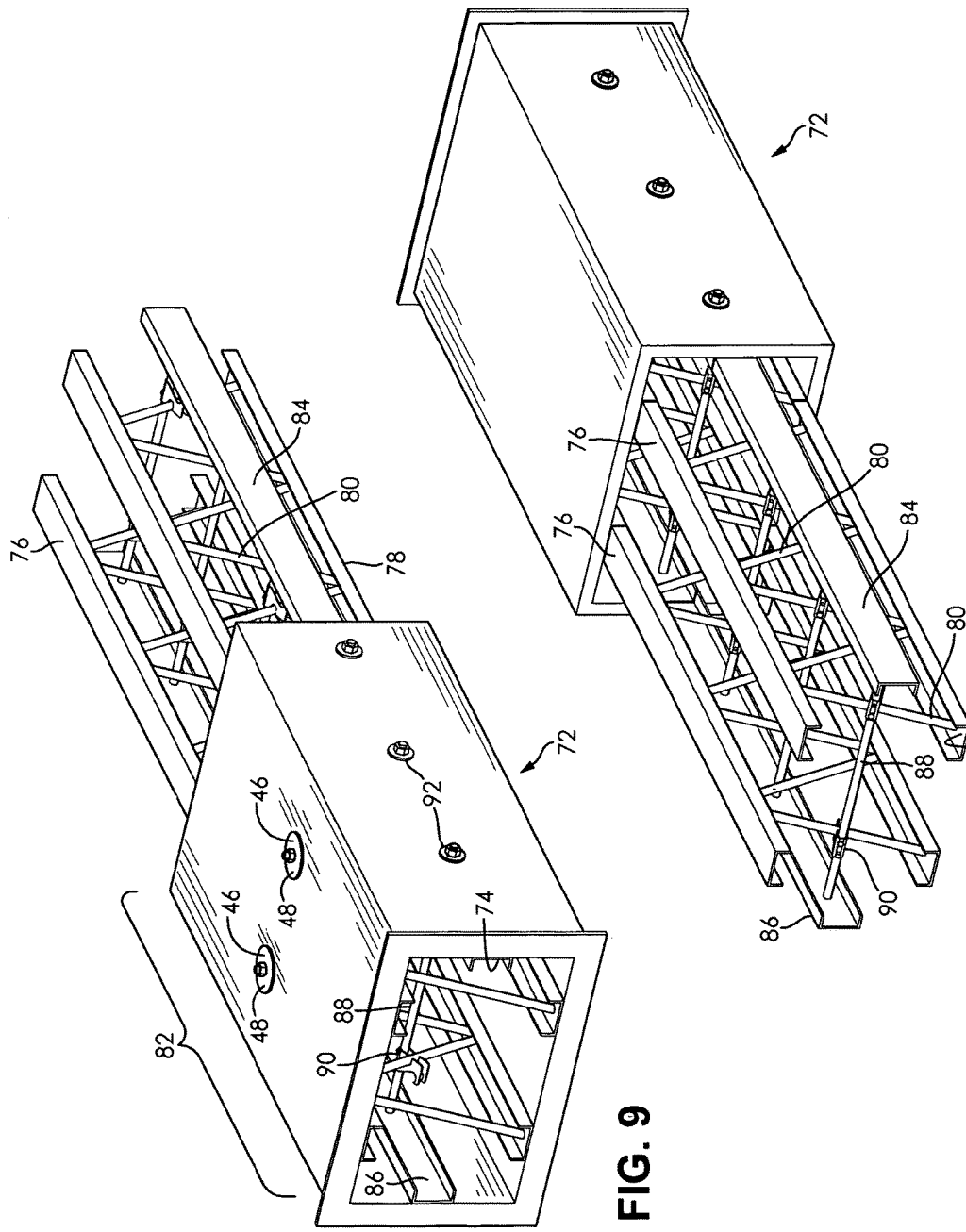

US 9,995,503 B2

STRUCTURALLY REINFORCED DUCT

This invention is a foam panel duct that is structurally superior to current ducts and able to withstand, for example, heavy snow loads when used outdoors, as well as extremely high and low internal pressure conditions.

SUMMARY OF THE INVENTION

Ducts made in whole or in part of sheet metal have been widely used in the HVAC field for a long time. Ducts comprising, in whole or in part, insulative foam panels are widely used in the HVAC field. Examples of such ducts are described in my US Published Application No. US 2014/0261846. That application describes ducts made of foam insulative panels with a sheet of thermoplastic material bonded to one side of the panels. These ducts have increased strength and rigidity compared to ducts made of foam panels only. Ducts made of insulative foam panels without reinforcement are also widely used. However, in some applications, additional strength and rigidity may be desired for ducts regardless of their construction and materials. This invention provides a reinforced duct structure that can withstand extreme external loading and extreme internal pressure loading without failing. The reinforced duct structure comprises internal, longitudinally extending ribs connected to interior surfaces of opposed duct walls. The reinforced duct structure further comprises compound struts positioned between opposed ribs and operable to exert compressive forces on opposed duct panels while maintaining them in a fixed, spaced, relationship. The structural reinforcement aspect of the present invention has application in ducts made of various materials, as well as other types of conduits and structures with opposed walls.

BRIEF DESCRIPTION OF THE DRAWING FIGURES

FIG. 9 is a perspective view of an assembly stage in the production of a truss supported duct according to the invention.

FIG. 10 is a perspective view of showing an assembly stage in the production of the duct shown in FIG. 10, with an internal truss support.

DETAILED DESCRIPTION OF EMBODIMENTS OF THE INVENTION

Figure 1:
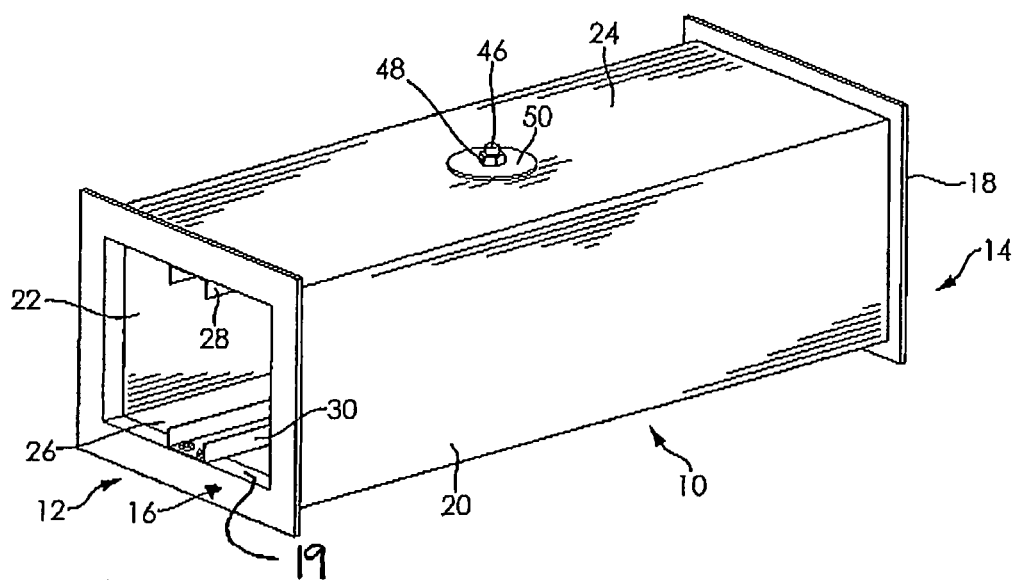
FIG. 1 is a perspective view of a structurally reinforced duct section according to the invention.
Figure 5:
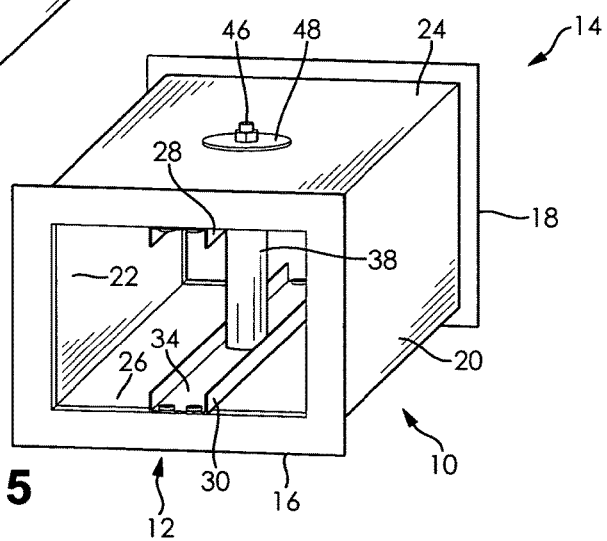
FIG. 5 is a perspective view of a structurally reinforced duct section according to the invention.
Figure 7:
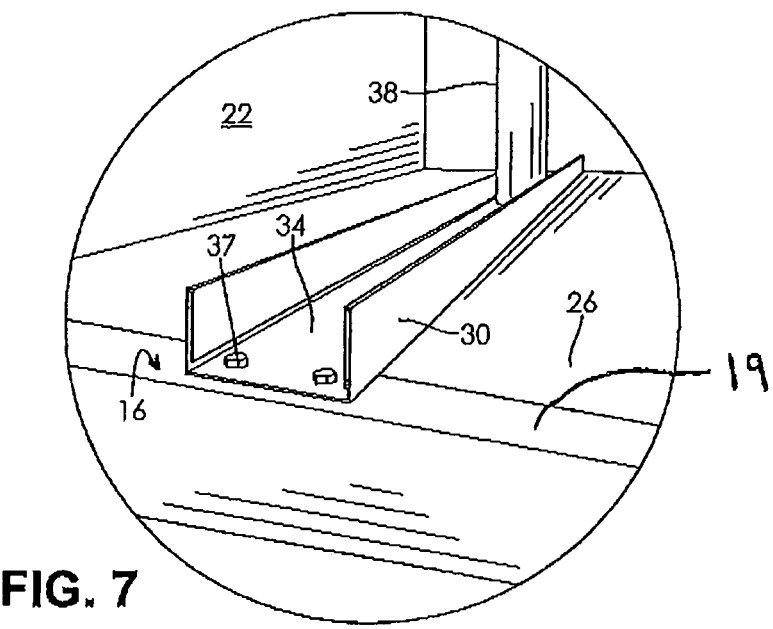
FIG. 7 is a perspective view showing the inside of a portion of a structurally reinforced duct section according to the invention.

In FIGS. 1 and 5, a structurally reinforced duct section according to one example of the invention is indicated generally at 10. The duct section 10 has a first end 12 and a second opposed end 14. Flanges 16 and 18 are secured to the ends 12 and 14, respectively and may serve to connect adjacent duct sections together. The flanges 16 and 18 are especially suited in the case where the duct is formed of rigid insulative foam or a composite material including rigid insulative foam. The flanges may correspond with the various flanges shown in U.S. Pat. No. 7,744,134, the disclosure of which is expressly incorporated herein by reference. The flanges 16 and 18 may correspond with the connector assembly shown in the patent and comprise a plurality of flanges 4, for example, and corner elements 5. Other connectors, such as tiger clips may be used to connect adjacent duct sections together, with or without Ranges. Sheet metal duct sections may be connected without the flanges and may include other types of connectors for connecting duct sections together. The flanges 16 and 18, when present, may be conventional four bolt flanges or they may be of another suitable construction. Preferably, the flanges 16 and 18 include means useful for connecting one duct section to another duct section as is known. The duct section 10 comprises opposed side panels 20 and 22, and further comprises opposed top and bottom panels 24 and 26. The panels 20, 22, 24, and 26 define an internal duct passageway. As shown in FIGS. 1 and 7, a portion, indicated at 19, of the flange 16, and a corresponding portion (not shown) of the flange 18, extend into the duct passageway. The panels 20, 22, 24, and 16 may be comprised of any known duct material or they may be comprised of any duct material developed hereinafter. Phenolic foam panels, such as are available from Kingspan under the name Koolduct, are well-suited for use in the present invention.

Figure 2:
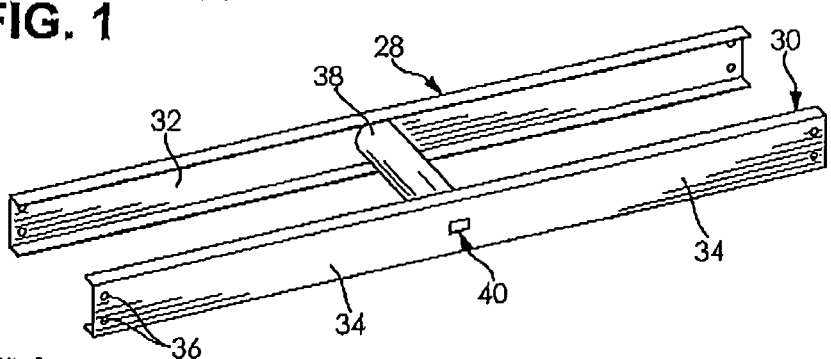
FIG. 2 is a perspective view of a portion of a duct reinforcing structure according to the invention.

A portion of a vertical reinforcing structure comprises an upper rib 28 and a lower rib 30 as shown, for example, in FIG. 2. The upper and lower ribs 28 and 30 shown in the drawing figures have a C-channel configuration. The ribs 28 and 30 have flat central portions 32 and 34, respectively, and two side walls which reinforce the ribs 28 and 30 to resist bending and flexing. The ribs 28 and 30 may have a C-channel configuration, as shown, or a different configuration. It is preferred that the ribs 28 and 30 include a flat portion to engage the inside of the panels 24 and 26. Apertures indicated at 36 are provided on the ends of the ribs 28 and 30 for securing them to the panels 28 and 30 or, preferably, to the flanges 16 and 18. The ends of the ribs 28 and 30 may be secured to the panels 24 and 26 and/or the flanges 16 and 18, by fasteners such as fasteners 37.

Figure 6:
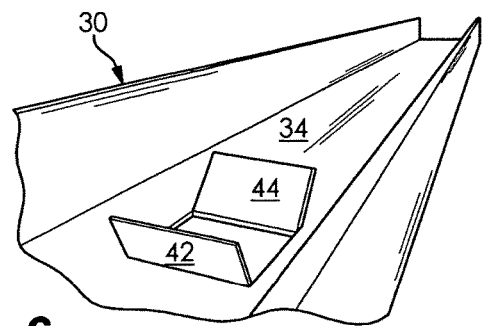
FIG. 6 is a perspective view of a portion of a rib including a composite strut positioning feature.

A compression member 38 of a composite strut is shown, in FIG. 2, extending between the central portions 32 and 34 of the ribs 28 and 30. The compression member 38 of the composite strut may be hollow with a circular cross section, and this is preferred. The compression member 38 may have one or more longitudinal discontinuities and it may have a polygonal cross section or other cross-sectional configuration. The compression member 38 of the composite strut may have any configuration that achieves the function of the compression member, namely, to resist movement of the ribs 28 and 30 towards each other. However, a cylindrical configuration is preferred. The ribs 28 and 30 have apertures, one of which is indicated generally at 40 in FIG. 2. Adjacent to the aperture 40, there is provided an optional compression member positioning element. In the embodiment shown in FIG. 6, the compression member positioning element comprises two wings 42 and 44 which may be formed from upturned portions of the central portion 32 of the lower rib 30. The wings 42 and 44 may be formed by punching and bending the central portion 34 of the rib 30. In the structure shown in FIG. 2, the wings 42 and 44 are received in the lower end of the compression member 38 of the composite strut. The wings 42 and 44 cooperate with the compression member 38 to resist lateral movement and longitudinal movement of the lower end of the compression member 38, relative to the rib 30. Similar structure may be provided on the other rib 28. In place of the wings 42 and 44, other positioning structure may be used to assist in positioning the compression member 38 relative to the rib 30 and/or to maintain the compression member 38 in a desired location during the steps involved in reinforcing a duct structure according to the invention. For example, a positioning element may be made by punching a hole in the rib 30 to create an upstanding wall or walls to engage one end of a compression member. Other positioning element(s) may be used including an element that is secured to the inside of the rib 30.

Figure 3:
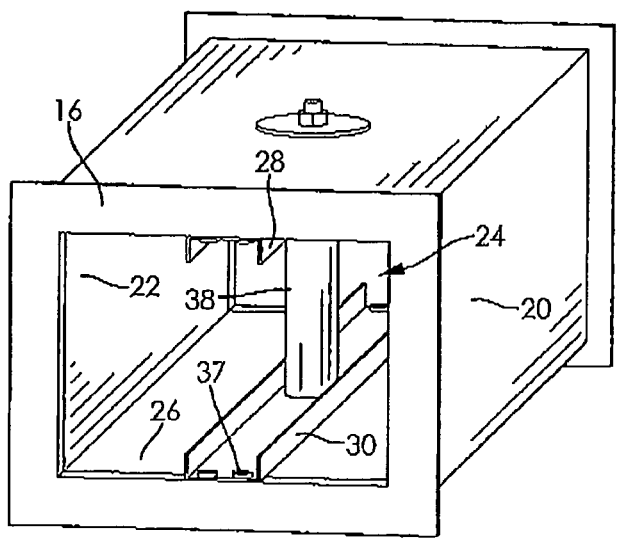
FIG. 3 is a perspective view showing the inside of a structurally reinforced duct section.

The portion of a vertical reinforcing structure seen in FIG. 2 is shown, in FIG. 3, positioned between the top and bottom panels 24 and 26 of the duct. The ribs 28 and 30 are held fast against the top and bottom panels 24 and 26 by the compression member 38. In addition, the ribs 28 and 30 may be fastened to the panels 24 and 26 and/or to the flanges 16 and 18 with fasteners such as the fasteners 37. Specifically, as shown in FIGS. 1 and 7, the fasteners 37 connect the portion 19 of flange 16 to a corresponding portion (not shown) of the flange 18. An adhesive may be used to temporarily or permanently secure the ribs 28 and 30 to the panels 24 and 26 and/or the flanges 16 and 18. In a case where the ribs are secured to the flanges 16 and 18, the ribs 28 and 30 will serve to maintain the longitudinal spacing between the flanges 16 and 18 and, further, to hold the flanges 16 and 18 in place at the ends 12 and 14 of the duct and the ends of the panels 20, 22, 24, and 26. The length of the compression member 38 is controlled so that, when it is positioned as shown in FIG. 3, the compression member 38 prevents the ribs 28 and 30, and the panels 24 and 26, from moving towards each. In other words, the length of the compression member 38 determines the minimum distance between the panels 24 and 26, and between the ribs 28 and 30.

Figure 4:
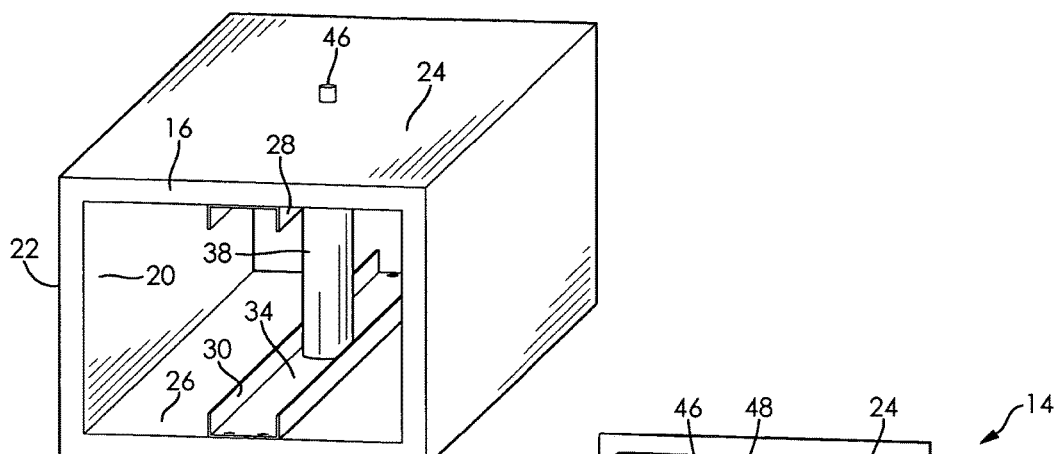
FIG. 4 is a perspective view showing the inside and the top of a duct section showing a stage in the process of structurally reinforcing the duct section.

A tension member 46 shown in FIGS. 1, 4, and 5 extends through the panel 24, the rib 28, the compression member 38, the rib 30 and the panel 26. In the example shown in the drawing figures, the tension member 46 has at least one end that is threaded and a threaded fastener 48 is provided and the two can be used to tension the tension member 46. The other end of the tension member may be threaded to cooperate with a threaded fastener. Alternatively, the other end of the tension member 46 may be provided with a radially extending flange, integral therewith or not. In that case, the tension member is tensioned at the threaded end. A force distribution member 50, one of which is shown in FIGS. 1 and 5, may be positioned between the threaded fastener 48 and the panel 24 or 26. In the case where both ends of the tension member are threaded, two force distribution members 50 may be used. The member 50 may be separate from, or integral with, the panels 24 and 26, or separate from or integral with the threaded fasteners 48. Alternatively, a force distribution member (not shown) may be provided on one end of the tension member, integral therewith if desired, so that the tension member 46 may be tensioned by manipulation at the opposite end only.

When the fastener(s) 48 is (are) tightened down, the tension member 46 will be placed in tension and it will exert tension on the system, biasing the panels 24 and 26 towards each other. Tension draws the member 50 (or an integral flange extending radially from one end of the tensioning member) tight against the top panel 24 placing the top panel 24 in compression between the member 50 (or a flange) and the upper rib 28, with the same effect on the bottom panel 26 which is placed in compression between a tension distribution member and the lower rib 30. The compression member 38 will be placed in compression between the upper and lower ribs 28 and 30, and the compression member 38 prevents the ribs 28 and 38 from moving towards each other. Thus, the top panel 24 is prevented from moving towards or away from the bottom panel 26. When a high pressure condition exists inside of the reinforced duct suction 10, the tension member 46, acting through the force distribution members on the outside of the reinforced duct section 10, prevents the panels 24 and 26 from moving away from each other. When the reinforced duct section 10 is subjected to compressive external forces due to, for example, exterior snow or ice loading, the compression member 38, acting through the ribs 28 and 30, prevents the panels 24 and 26 from moving toward each other. When the reinforced duct section 10 is subjected to high internal air/fluid pressure tending to move the duct panels 24 and 26 away from each other, the tension member 46 prevents the panels 24 and 26 from moving away from each other. Thus, the reinforced duct section 10 is doubly reinforced to withstand internal high pressure loads and external compressive loads and to maintain opposed duct panels a fixed distance from each other. In the example shown in the drawings, the compression member 38 and the tension member 46 float relative to each other with the result that, in a static condition, the compressive force exerted on the top panel 24 is equal to the compressive force exerted on the bottom panel 26.

A method for reinforcing a duct comprising the panels 20, 22, 24, and 26 may be carried out as follows. Upper and lower ribs 28 and 30 are positioned inside of the duct adjacent to the panels 24, and 26. Preferably, the ribs 28 and 30 extend from one end 12 of the duct to the opposite end 14 and are secured, at their ends, to flanges 16 and 18 to provide longitudinal reinforcement. However, the ribs may be shorter than the length of the duct so that they act only as force distribution members. However, this will result in less reinforcement than the preferred structure. The compression member 38 is positioned between the ribs 28 and 30 and they are aligned, at their ends, with the rib apertures 40. Preferably, positioning elements, such as wings 42 and 44, engage the compression member 38 keeping it aligned with the apertures 40 in the ribs 28 and 30. A tension member 46 is inserted through an aperture formed in one of the top and bottom panels 24 and 26, through a rib aperture 40, through the compression member 38, through an aperture in the opposed rib, and through an aperture in the other one of the top and bottom panels 24 and 26. The tension member 46 also passes through an aperture in one or more force distribution members 50 positioned outside of the duct, if such members are present. The tension member 46 is then placed in tension and that tension places the compression member 38 in compression. As a result, portions of the top and bottom panels 24 and 26, adjacent to the tension member 46, are placed in compression between the ribs 28 and 30 and the force distribution members or the like provided on the outside of the panels 24 and 26. The tension member 46 controls the maximum distance between the panels 24 and 26 and prevents them from moving apart.

Figure 14:
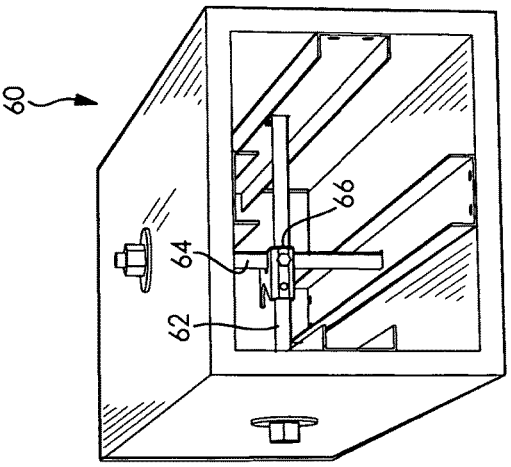
FIG. 14 is a perspective view showing the inside of a structurally reinforced duct section according to the invention.

Turning now to FIG. 14, a reinforced duct section is indicated generally at 60. A longitudinally extending rib is provided on the side panels, the bottom panel, and the top panel (not shown). A first compression member 62 extends horizontally between the ribs. on the side panels. A second compression member 64 extends vertically between the ribs on the top panel and the bottom panel. Each compression member is part of a reinforcing system including a tension member and corresponding with the reinforcing system described above with reference to FIGS. 1 through 7. In this example, the duct is doubly reinforced as between the top and bottom duct panels, on the one hand, and between the side duct panels, on the other hand. This structure gives the reinforced duct section 60 shown in FIG. 14 extreme structural integrity in order that it may withstand extreme internal and external forces while retaining its shape and integrity. Additional structural integrity may be achieved in this embodiment by connecting the two compression members 62 and 64 together where they cross with a suitable connector such as the one indicated at 66. In that case, the compression members 62 and 64 would have the same position, longitudinally, within the duct. However, vertical compression members and horizontal compression members may be staggered, or spaced longitudinally from each other, along the duct.

Figure 8:
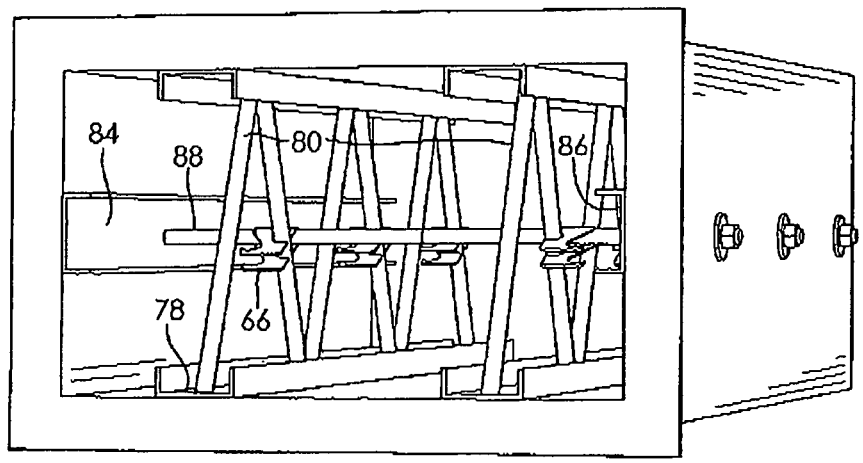
FIG. 8 is an internal view of a duct run having an internal truss according to one embodiment of the invention.

Referring now to FIGS. 8 through 10, a duct section is indicated generally at 72. A duct run may comprise multiple duct sections 72 which are connected with connectors 74. For example, the duct section connectors 74 may comprise flange rails and corner connectors, or they may comprise other known connectors or connectors hereafter invented. Individual duct sections 72 are internally supported so that a duct run comprising multiple duct sections 72 may be better able to withstand high and low internal pressures. In addition, in some embodiments, long duct runs may be suspended without the use of intermediate hangers or other load carrying external supports, i.e., supported only at their ends. The internal supports, as described below, provide reinforcement of the wall panels of individual duct sections 72 to resist deformation of the wall panels under very high and very low internal pressures.

In FIGS. 8, 9, and 10, reinforcement of one kind of duct section is provided by two, parallel, vertically oriented planar Warren type trusses with upper rib members 76 comprising C-channels opening downwardly and lower members 78 comprising C-channels opening upwardly. Diagonally oriented chords 80 connect the upper and lower C-channels 76 and 78. The chords 80 serve to maintain the upper and lower C-channel members 76 and 78 in a parallel relationship when the chords 80 are in compression and when the chords 80 are in tension. Upper and lower panels of a duct section 72 are secured to the upper and lower C-channel members 76 and 78 for example, by threaded fasteners and force distribution members, as described above. Specifically, a threaded fastener is inserted through a force distribution member and turned into and through a foam panel wall, and into the corresponding C-channel so that the foam panel wall is held captive between the force distribution member and the C-channel member. It will be appreciated that other truss types may be used, although a Warren type truss is preferred. In this case, the truss serves as the compression member and the truss together with the force distribution member serve as tension members.

Generally speaking, long duct sections 72 have a relatively small cross section and short duct sections 72 have a relatively large cross section. The duct section 72 shown in Figures and 10 may be considered to be relatively short with a relatively large cross section. Thus, two trusses are used. A single truss may be sufficient in duct sections having relatively smaller cross-sections. In short duct sections made of rigid foam, two connections indicated at 82 between the top panel of the duct section and the upper C-channel members 76 will be sufficient, with two corresponding connections between the bottom panel of the duct section and the lower C-channel members. The trusses provide support over long spans comprising several duct sections. In addition, co-action between the upper and lower C-channel members and the upper and lower duct section panels resist inward flexure of the upper and lower panels of the duct section when very low pressure, i.e., vacuum conditions, exist within the duct sections. At the same time, force distribution members, such as the members 50, are secured to the outside of a foam panel wall by threaded fasteners, for example, that extend through the foam panel wall and into the upper and lower C-channel members 76 and 76. Thus, the force distribution members resist outward flexure of the upper and lower panels of the duct section under high pressure conditions within the duct.

Lateral bracing of the side panels of the foam panel of the duct section is afforded by side braces comprising left and right C-channel members 84 and 86, respectively. The members 84 and 86 are maintained in parallel spaced relationship by laterally extending struts 88 which may be secured to the chords 80, as indicated at 90 shown in FIGS. 10 and 11. Force distribution members 92 secure the side panels of the duct section to the left and right C-channel members 84 and 86.

The partial assembly shown in FIGS. 9 and 10 may be produced as follows. The Warren trusses are assembled and aligned, and secured in parallel relationship by connecting the side struts 88 to the chords 80 of the trusses. This creates a skeleton around which a duct section is built. The top, bottom and side walls of the duct section may be made from a pre-cut foam panel of the type disclosed in my U.S. Pat. No. 8,733,749, the disclosure of which is hereby expressly and wholly incorporated herein by reference. The pre-cut foam panel is folded around the Warren trusses and the side braces, and secured to the C-channel members 76, 78, 84, and 86 of the skeleton by, for example, threaded fasteners and force distribution members. The threaded fasteners may be driven through the foam panels and into the C-channel members so that the foam panels are held captive between the C-channel members and the force distribution members. The C-channel members resist inward deformation of the top, bottom and side panels when the interior of the duct section is at a low pressure, i.e., a vacuum. The force distribution members outside of the foam panel walls hold the panel walls against the C-channel members and resist outward deformation thereof. If desired, the upper C-channel members and/or the lower C-channel members may be held in fixed spaced relationship with strut members (not shown) to help maintain the trusses in spaced parallel relationship. The side braces may be omitted in case the side walls of the duct section are not very tall, i.e., relatively short such as, for example 12, inches or less.

Figure 11:
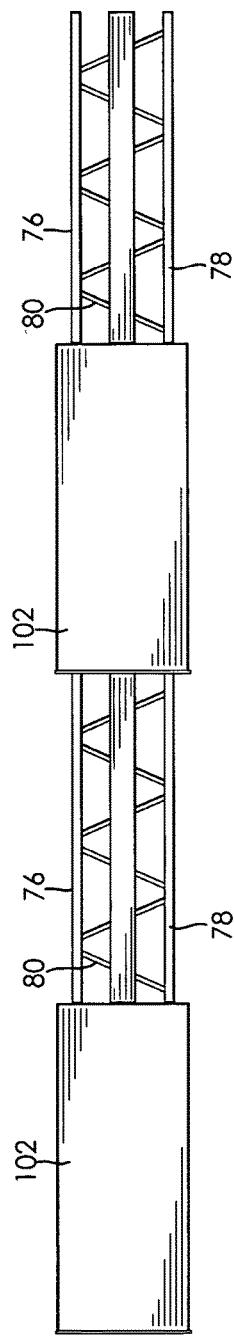
FIG. 11 is a side view of duct sections, spaced apart, on an internal truss support.
Figure 12:
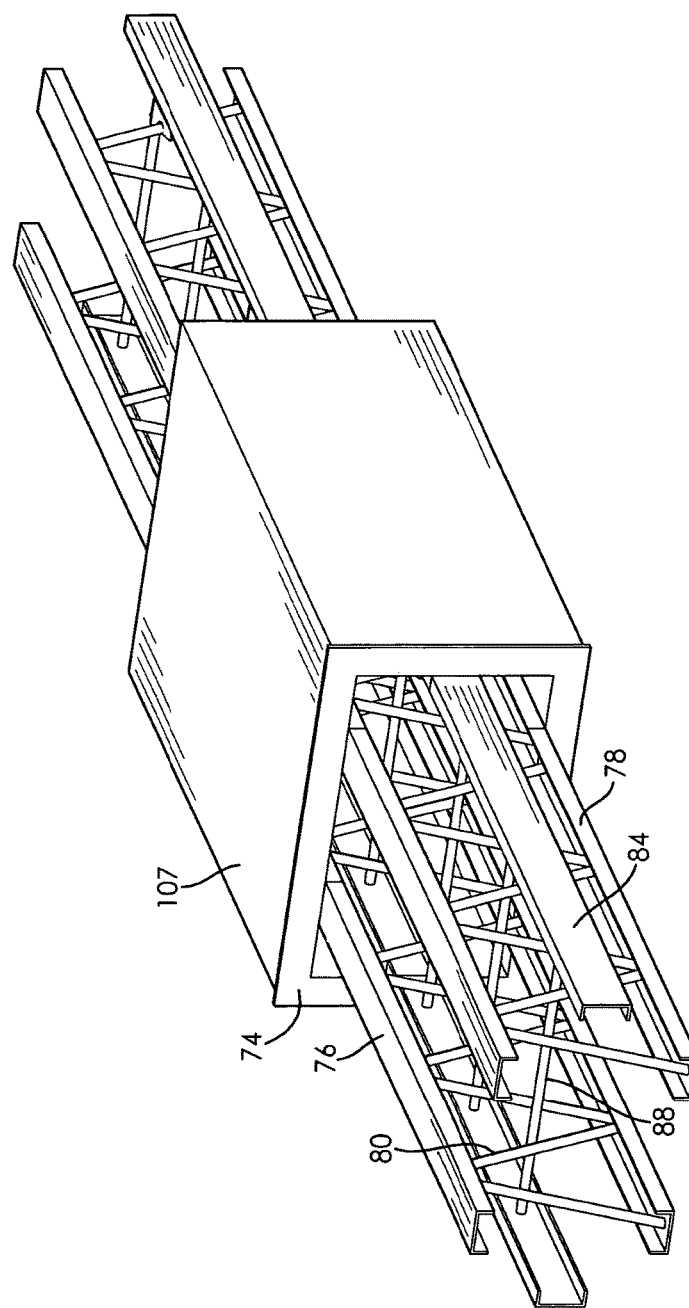
FIG. 12 is a perspective view of a duct section with an internal truss extending from both ends of the duct section.
Figure 13:
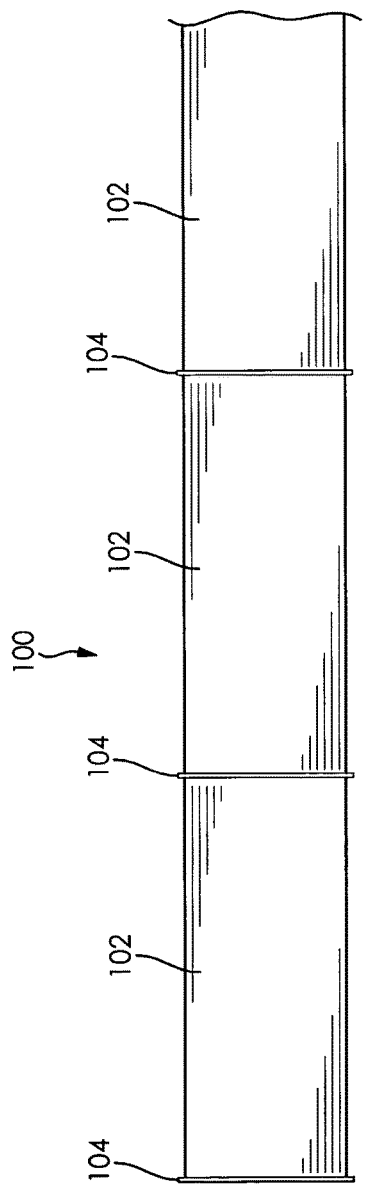
FIG. 13 is a side view of a duct run comprised of the duct sections shown in FIGS. 11 and 12.

Another type of duct may be formed from duct sections produced in accordance with the disclosure of my U.S. Pat. No. 9,114,579, the disclosure of which is expressly and wholly incorporated herein by reference. Those duct sections are made from a laminate of rigid thermoplastic bonded to a foam panel and formed into a duct section as described in the patent. The rigid thermoplastic gives this type of duct section adequate resistance to inward and outward deformation of the duct section top, bottom and side walls. As shown in FIGS. 11 and 13, a duct run 100 comprises multiple duct sections 102 which are connected with connectors 104. For example, the duct section connectors 104 may comprise flange rails and corner connectors, or they may comprise other known connectors or connectors hereafter invented.

The duct sections 102 may simply be slid over a truss assembly of the type described above with reference to FIGS. 8 through 10, and connected to each other with connectors 104. In other words, the walls of duct sections 102 need not be secured to the truss because the walls are rigid enough to withstand high and low pressure conditions within the duct. In this embodiment, the truss serves to support a duct run made of many duct sections 102, having a very long length, without the need for hangers or other supports.

Figure 15:
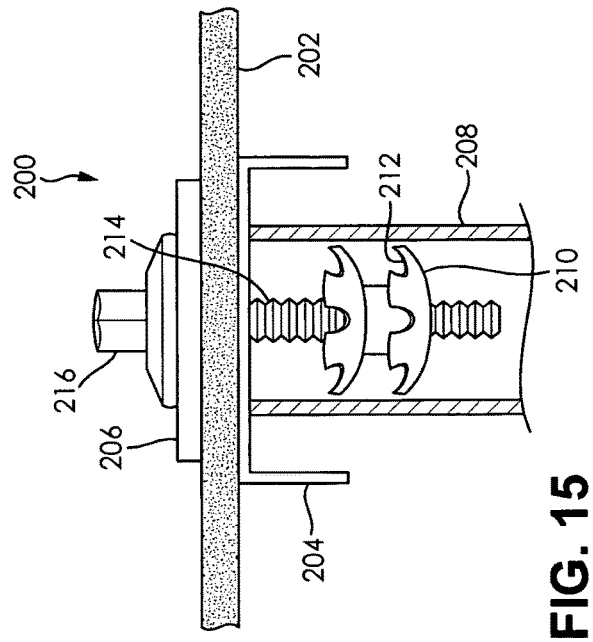
FIG. 15 is a cross sectional view showing an example of a compression member and a tension member comprising a single compression and tension member.

Referring now to FIG. 15, an assembly 200 comprises a duct wall panel 202 held captive between a rib 204 and a force distribution member 206. One end of a compression member 208 abuts the rib 204 and the other end (not shown) abuts an opposing rib, adjacent to and inside of an opposing duct wall panel, and the compression member 208 prevents the ribs and the adjacent duct wall panels from moving towards each other or, in other words, prevents the opposed duct wall panels from bowing in. A friction gripping member 210 is positioned inside of the compression member 208. Gripping fingers 212 extend outwardly to engage an interior passageway in the compression member. The fingers 212 are oriented so that it is easier to push the member 210 into the compression member 208 than it is to pull the member 210 out of the compression member 208. A fastener 214 engages the member 210 and extends through the duct wall panel 202, through the force distribution member 206 to a fastener terminal 216. In the assembly shown in FIG. 15, the rib 204 and the duct wall panel 202 are held captive between the compression member 208 and the force distribution member 206. The compression member 208 prevents opposed duct wall panels from bowing inwardly. The compression member 208 and the force distribution member 206 cooperate to serve as a tension member to prevent opposed duct wall panels from bowing outwardly.

Figure 16:
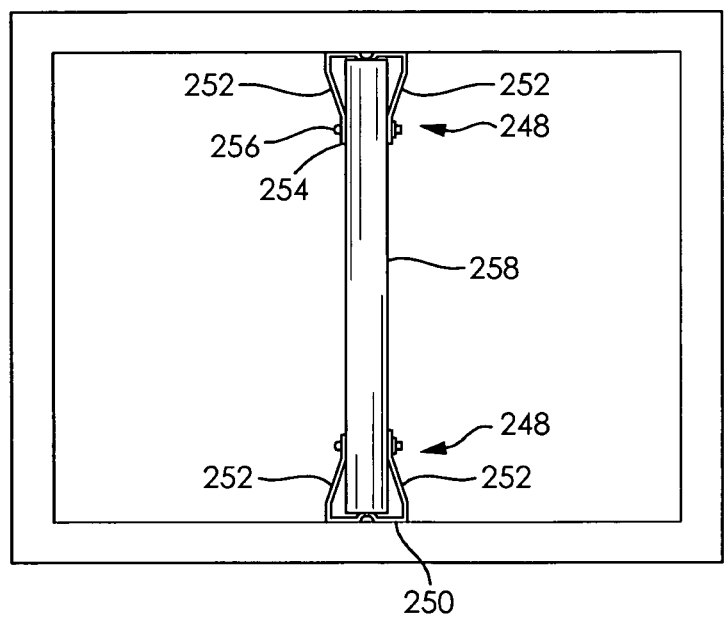
FIG. 16 is an end view of a truss reinforced duct showing an alternative form of rib.

FIG. 16 shows a modified configuration for a rib. The modified rib indicated at 248 has a bottom section 250 which engages an interior surface of a duct wall panel. Side walls 252 extend upwardly from the bottom section 250. At least a portion, indicated at 254, of the side walls 252 are adjacent to a member 258 and secured thereto be, for example, a fastener 256. The member 258 may correspond with one of the previously described compression members or the chord of a truss.

A person having ordinary skill in the field of this invention will comprehend the invention from the foregoing description considered together with the appended drawing figures. It will be apparent to that person that the invention encompasses the reinforced duct structure described above as well as a reinforced duct structure wherein structurally and/or functionally equivalent elements are substituted for the elements described herein. It will also be appreciated that the bracing and truss configurations may be applied to duct sections made of sheet metal. The duct reinforcing system described above can be applied to ducts having more than two pairs of opposed panels.

I claim:

1. A duct section comprising
   foam panel side walls defining a duct passageway, said foam panel side walls having first and second ends, wherein a first one of said foam panel side walls and a second one of said foam panels side walls are spaced apart and are generally parallel to each other,
   a first rib extending longitudinally along an inside surface of said first foam panel side wall,
   a second rib extending longitudinally along an inside surface of said second foam panel side wall,
   a compression member secured between said first and second ribs and operable to prevent said first and second foam panel side walls from moving towards each other,
   first and second force distribution members on outside surfaces of said first and second foam panels side walls,
   a tension member connecting said first and second force distribution members so that they prevent the first and second side wall panels from moving away from each other,
   a first flange secured to the first ends of said foam panel side walls and having a portion that extends into the duct passageway,
   a second flange secured to the second ends of said foam panel side walls and having a portion that extends into the duct passageway, and
   fasteners connecting said first and second ends of said first and second ribs to the portions of said first and second flanges that extend into the duct passageway.

2. The duct section claimed in claim 1 wherein said first and second ribs are comprised of C-channel members.

3. The duct section claimed in claim 1 where said tension member comprises a rod with threaded ends.

4. The duct section claimed in claim 1 wherein said compression member comprises a section of conduit.

5. The duct section claimed in claim 3 wherein said rod is positioned inside of said conduit.

6. The duct section claimed in claim 1 wherein said tension member and said compression member are unitary.

7. The duct section claimed in claim 6 wherein said unitary tension member and compression member comprises conduit.

8. The duct section claimed in claim 1 further comprising positioning elements provided on said ribs and operable to locate the ends of said compression member relative to said ribs.

* * * * *